United States Patent Office 2,810,109
Patented Oct. 15, 1957

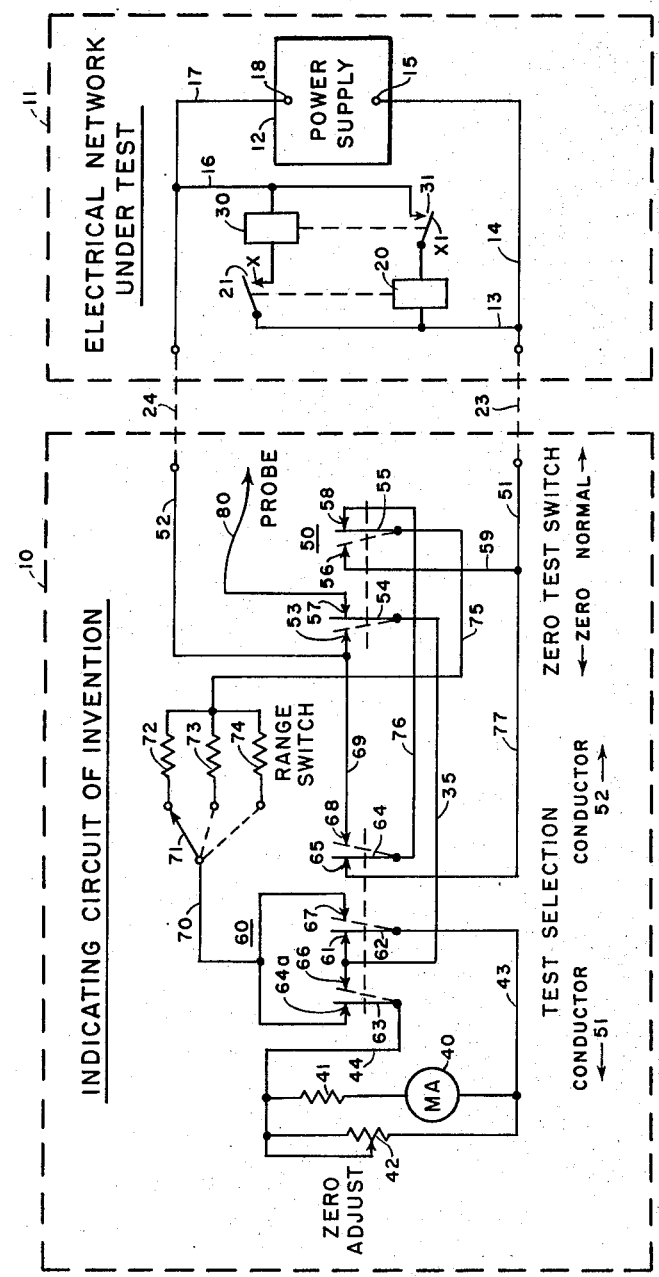

2,810,109

ELECTRICAL TESTER

Arnold H. Breggin, Rochester, N. Y., assignor, by mesne assignments, to General Dynamics Corporation, a corporation of Delaware Application March 8, 1955, Serial No. 492,868

3 Claims. (Cl. 324—51)

The present invention relates to electrical indicating circuits, and more particularly to electrical indicating and measuring circuits for indicating and measuring current flow for purposes of continuity testing and resistance measuring.

Many of the more complex electrical networks have a plurality of electrical elements, such as relays, resistances, and coils, interconnected through various switch contacts, either opened or closed, to the terminals of a network power supply. For example, the control circuits used in automatic telephone systems employ relatively large numbers of relays whose operating coil impedances or resistance values are relatively critical. Also, the relay coils in such telephone control circuits may occasionally burn out and it is therefore necessary to make continuity tests to locate the burned out coil. Prior to this invention, the making of a continuity test or the measurement of the impedance or resistance value of relay coils in a complex electrical network required a rather tedious use of conventional portable testing devices with the application of two test probes to input and output terminals respectively of each element to be tested in order to apply the indicating power to the circuit under test.

It is an object of the invention to provide an improved electrical continuity testing or electrical current flow measuring device.

It is another object of the present invention to provide an improved electrical indicating circuit for simplifying the testing of electrical continuity or measurement of current flow through those electrical elements that are normally connected in a network having a self-contained network power supply.

The invention in its simplest form comprises a current responsive indicating device, such as a galvanometer, ammeter, light bulb, or the like. The indicating means may be connected through a selecting switch in an electrical circuit with a first conductor adapted to be connected to one terminal of the network power supply or a second conductor adapted to be connected to the other terminal of the network power supply. A test probe is also provided. The aforementioned switching means is provided to selectively connect the current responsive indicating device in series with the test probe and a selected one of the first or second conductors so that a circuit may be established from one terminal of the power supply through the coil or resistance of the element under test to the probe conductor and then through the current responsive indicating device to the other terminal of the network power supply. With this arrangement, the network power supply is used to power the current responsive indicating device, and it is only necessary to operate the switching device to establish a continuous circuit from one terminal of the power supply through the element to be tested, the test probe, and the current responsive device to the other terminal of the power supply.

Further objects and advantages of the invention will be apparent with reference to the following specification and accompanying drawing.

The indicating circuit of the invention is generally shown as enclosed within a dotted block 10 while a representative example of an electrical network under test is generally shown as enclosed within a separate dotted block 11. The electrical network under test includes a power supply, shown at 12, which may be either a direct current or an alternating current power supply. For purposes of the present description, the power supply 12 will be considered to be an alternating current power supply. Network relay coils are shown at 20 and 30. One terminal of the network relay coil 20 is shown to be normally connected by conductors 13 and 14 to one terminal 15 of the power supply 12, while one terminal of the relay coil 30 is shown to be normally connected by conductors 16 and 17 to the second terminal 18 of power supply 12. The relay coil 20 may be provided with any number of relay contacts, such as relay contact 21 arbitrarily shown in a circuit for energizing the relay coil 30 when relay 20 is operated. Similarly, relay coil 30 may be provided with any number of relay contacts, such as the relay contact 31 arbitrarily shown in a circuit for energizing the relay coil 20 when relay 30 is operated.

The indicating circuit 10 of the invention includes a current responsive indicating device, such as the milliammeter 40, having a suitable calibrating resistance 41 in series therewith and a suitable zero adjust rheostat 42 connected in parallel with the meter 40 and its calibrating resistance 41 as is conventional and well understood. As stated before, for purposes of the present description it is assumed that the power supply 12 of the electrical network under test is of the alternating current type and therefore the current responsive device 40 should be responsive to alternating current and may be calibrated in terms of impedance. Of course, if direct current tests are to be made, the indicating device 40 may be a suitable direct current responsive meter and may be calibrated in terms of resistance values.

The indicating circuit 10 is provided with a so-called zero test switch, generally shown at 50, having double-pole, double-throw switch contacts. The switch 50 is shown in the normal position for testing. When it is desired to zero the meter 40 at the beginning of a test, the switch 50 should be moved to the dotted line position which connects the current responsive meter 40 in series with test conductors 51 and 52. The aforementioned zero test circuit may be traced from conductor 52 through switch contact 53, switch arm 54, conductor 35, switch contact 61, switch arm 62, conductor 43, meter 40, resistance 41, conductor 44, switch arm 63, switch contact 64a, conductor 70, switch arm 71, a selected one of resistors 72—74, conductor 75, switch arm 55, switch contact 56, and conductor 59 to conductor 51. Conductors 51 and 52 may be connected by clip leads, shown by dotted lines at 23 and 24, to the network conductors 14 and 17 and, therefore, the power supply terminals 15 and 18 of the electrical network under test. Thereafter, with the zero test switch 50 still in the dotted line position establishing the circuit traced above, the meter 40 may be zero adjusted by operation of the zero adjust rheostat in the conventional well known manner. It is assumed that the zero testing of the meter 40 is required for purposes of reference in the event that the meter 40 is calibrated in terms of A. C. impedance and it is desired to zero-out the resistance or voltage equivalent of the power supply 12. The range selector switch 71 is also conventional and its purpose in selecting a particular one of the range selecting resistors 72—74 is well known and need not be further described.

After adjusting the meter 40 for zero, as described above, the zero test switch 50 may be actuated to the normal test position as shown by the solid line position on the drawing. The electrical clip leads 23 and 24 are allowed to remain connected to the terminals of the power supply, as previously described. With the zero test switch 50 in the normal position, the meter probe 80 will be connected in series with the meter 40 and a selected one of the conductors 51 or 52 depending upon the position of the test selector switch, generally shown at 60, as will be more fully described. For example, with the test selector switch 60 in the solid line position shown, the probe 80 will be connected in series with the meter 40 and the conductor 51, while with the test selector switch 60 in the dotted line position, the probe conductor 80 will be connected in series with the meter 40 and the conductor 52.

The specific circuit with the test selector switch 60 in the solid line position is from the probe 80 through switch contact 57, switch arm 54, conductor 35, switch contact 61, switch arm 62, conductor 43, meter 40, resistance 41, conductor 44, switch arm 63, switch contact 64a, conductor 70, switch arm 71, resistance 72, conductor 75, switch arm 55, switch contact 58, conductor 76, switch arm 64, switch contact 65, and conductor 77 to conductor 51. Thus, under such circumstances, the probe 80 may establish contact at terminal X of relay coil 30 in the electrical network under test and the impedance of the coil 30 will be indicated on the meter 40 due to current flow from the terminal 18 of power supply 12 through relay coil 30, terminal X, probe 80, meter 40, conductor 51, clip lead 23, and conductor 14 to terminal 15 of the power supply 12.

With the test selector switch 60 in the dotted line position, a circuit is established from the probe 80 through switch contact 57, switch arm 54, conductor 35, switch contact 66, switch arm 63, conductor 44, resistance 41, meter 40, conductor 43, switch arm 62, switch contact 67, conductor 70, switch arm 71, resistance 72, conductor 75, switch arm 55, switch contact 58, conductor 76, switch arm 64, switch contact 68, and conductor 69 to conductor 52. Under such conditions, the test probe 80 may be connected to terminal X1 of relay coil 20 and the impedance of the relay coil 20 may be measured by current flow from the network power supply terminal 15 through conductors 14 and 13, relay coil 20, terminal X1, probe 80, meter 40, conductor 52, clip lead 24, and conductor 17 to the power supply terminal 18.

It will be seen from the above description that it is not necessary to disturb the clip lead connections 23 and 24 when measuring different electrical elements in the network, such as relay coils 20 or 30, even though relay coil 20 has a terminal normally connected to one terminal of the power supply 12 while relay coil 30 has a terminal normally connected to the other terminal of the power supply 12. In order to establish the correct measuring circuit to the meter probe 80 it is only necessary to operate the test selection switch 60 to the corresponding position for connecting the meter 40 in series with the probe 80 and the desired one of the conductors 51 or 52. In view of the above description, it should be apparent that the indicating circuit of the invention is considerably simplified in that it does not require a self-contained power supply. Furthermore, only one probe 80 need be connected to the necessary terminal of the element under test in order to establish a current flow from the network power supply through the element under test in series with the indicating device or meter.

Although the invention has been specifically described in connection with the indication or measurement of alternating current phenomenon, it should be understood that the principles of the invention may be equally well adapted for use with electrical networks such as the aforementioned telephone circuits which are usually powered by direct current power supplies. Under such circumstances, the test selection switch 60, connected in the circuit as shown, functions automatically to maintain the correct polarity of current flow through the indicating meter 40, when such meter responds only to direct current, and the meter may be calibrated in terms of resistance instead of impedance.

Alternatively, the circuit of the invention may be used as a simple continuity tester in which case the meter device 40 may be replaced by any type of current responsive device, such as a light, neon lamp, or the like.

Various modifications may be made within the spirit of the invention and the scope of the appended claims.

What is claimed is:

1. An indicating circuit for use in indicating current flow through an element having at least two terminals in an electrical network of the type including a self-contained power supply having first and second power supply terminals with solely one terminal of the element connected to a respective power supply terminal, including in combination, current responsive indicating means, a first conductor having one end thereof connected to the first terminal of said network power supply when said circuit is in use, a second conductor having one end thereof connected to the second terminal of said network power supply when said circuit is in use, a probe conductor having one end thereof for connecting to a terminal other than said one terminal of the element to be measured when said circuit is in use, and switch means for selectively connecting the other end of said probe conductor in series with said indicating means to the other end of that one of said first and second conductors which has its other end connected to the other respective power supply terminal, whereby current flow from one terminal of said power supply through said element and said indicating means to the other terminal of said power supply may be indicated.

2. A meter circuit for use in measuring electric current flow through an element having at least two terminals in an electrical network of the type including a self-contained network power supply having first and second power supply terminals with solely one terminal of the element connected to a respective power supply terminal, including in combination, a current responsive meter, a first meter conductor having one end thereof connected to the first terminal of said network power supply when said circuit is in use, a second meter conductor having one end thereof connected to the second terminal of said network power supply when said circuit is in use, a meter probe conductor having one end thereof for connecting to a terminal other than said one terminal of the element to be measured when said circuit is in use, and switch means for selectively connecting the other end of said probe conductor in series with said meter to the other end of that one of said meter conductors which has its one end connected to the other respective power supply terminal, whereby current flow from one terminal of said network power supply through said element and said meter to the other terminal of said network power supply may be measured.

3. A meter circuit for use in measuring electric current flow through an element having at least two terminals in an electrical network of the type including a self-contained network power supply having first and second power supply terminals with solely one terminal of the element connected to a respective power supply terminal, including in combination, a current responsive meter, a meter zero adjusting rheostat connected in parallel with said meter, a first meter conductor having one end thereof connected to the first terminal of said network power supply when said circuit is in use, a second meter conductor having one end thereof connected to the second terminal of said network power supply when said circuit is in use, a meter probe conductor having one end thereof for connecting to a terminal other than said one terminal of the element to be measured when said circuit is in use, first switch means selectively operated to connect said meter in series with the other ends of said first and second meter conductor to provide current flow from said power supply through said meter and thereby permit said meter to be zero adjusted, and second switch means for selectively connecting the other end of said probe conductor in series with said meter to the other end of that one of said meter conductors which has its one end connected to the other respective power supply terminal, whereby current flow from one terminal of said network power supply through said element and said meter to the other terminal of said network power supply may be measured.

References Cited in the file of this patent

UNITED STATES PATENTS

| | | |
|---|---|---|
| 2,315,649 | Parker | Apr. 6, 1943 |
| 2,413,521 | Roskilly | Dec. 31, 1946 |
| 2,540,402 | Mosier | Feb. 6, 1951 |